No. 772,484. PATENTED OCT. 18, 1904.
H. G. WATSON.
MEANS FOR MANUFACTURING AERATED OR CARBONATED LIQUIDS.
APPLICATION FILED JAN. 28, 1903.
NO MODEL.
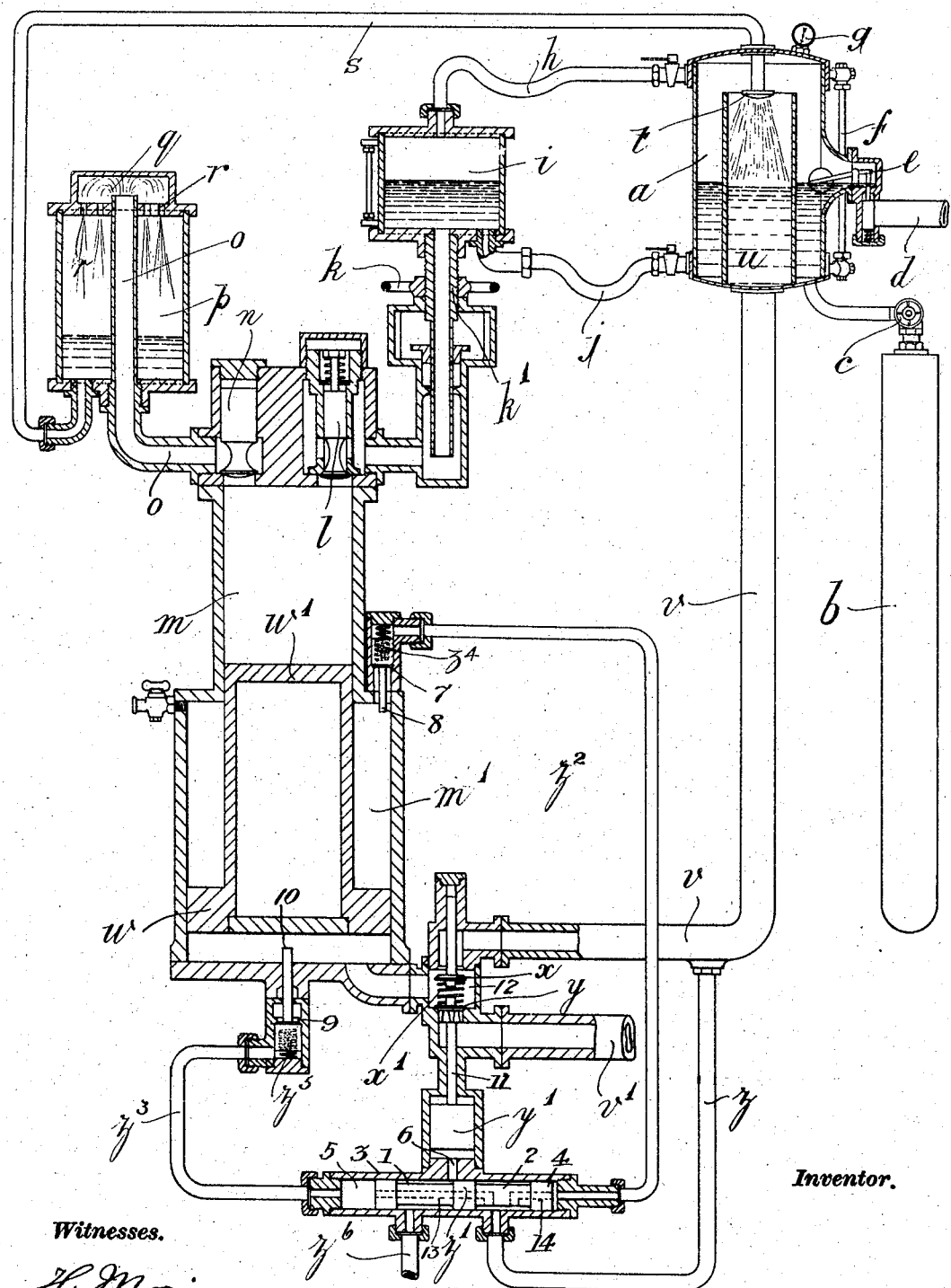
Witnesses.
H. Mori.
L. Kaldman.
Inventor.
Hugh Glass Watson
by P. Singer.
Att'y.

No. 772,484. Patented October 18, 1904.

UNITED STATES PATENT OFFICE.

HUGH GLASS WATSON, OF COATBRIDGE, SCOTLAND.

MEANS FOR MANUFACTURING AERATED OR CARBONATED LIQUIDS.

SPECIFICATION forming part of Letters Patent No. 772,484, dated October 18, 1904.

Application filed January 28, 1903. Serial No. 140,887. (No model.)

*To all whom it may concern:*

Be it known that I, HUGH GLASS WATSON, manager, a subject of the King of Great Britain, residing at 16 Coats street, Coatbridge, Lanarkshire, Scotland, have invented certain new and useful Improvements in the Means for Manufacturing Aerated or Carbonated Liquids, of which the following is a specification.

This invention relates to improvements in apparatus for the manufacture of aerated or carbonated liquids.

Generally speaking, at present it is usual in aerated-water factories to first generate the gas and then collect it in a gas-holder, from which it passes to a mechanically-operated pump driven from a power-shaft or by hand. This pump forces the gas, along with the liquid, into a condenser under considerable pressure. From the condenser the combined gas and liquid passes to the filling-nozzles for filling the bottles or to a bottling-machine. In some cases instead of generating the gas the gas is supplied from a tube containing liquefied carbonic-acid gas.

Under my invention I adopt entirely new means for manufacturing the aerated or carbonated liquid in which the carbonic-acid gas under a high pressure is supplied from a compressed gas cylinder or tube to a vessel in which it is mixed with water, and the mixture then passes to the automatic and continuously acting pressure-pump, where it is subjected to pressure in the usual manner, and after passing from the pump to a spraying-chamber is utilized to actuate the pump and is then exhausted from the pump to the bottling-machine and filled into the bottles. By adopting this system a great saving is effected, as no auxiliary power, such as an engine, is required to drive the pump, and, further, the whole apparatus can be worked continuously with very little expense as compared with the present machines.

The drawing shows in section the complete apparatus arranged so that the pump is driven by the aerated liquid.

The vessel $a$ is supplied with water from the water-main or otherwise and with gas from a compressed gas-tube $b$, conveniently arranged. The gas-tube is supplied with a reducing-valve $c$, so as to reduce the gas-pressure to the degree required, while the vessel $a$ is provided with a ball-cock $e$ or other device for regulating the inflow of water from the pipe $d$ and a water-gage $f$ and a pressure-gage $g$. The gas is preferably allowed to enter at the bottom of the vessel $a$, so that it may bubble up through the water and part of it become absorbed thereby. From this vessel $a$ a flexible pipe $h$ extends to the top of a mixing-chamber $i$, and a flexible water-pipe $j$ extends to the bottom thereof. The mixing-chamber is preferably arranged at such a height that the water in it stands at the same level as the water in the vessel $a$. The mixing-chamber may be so arranged on the screw-threaded column $k'$ that it can be raised or lowered by means of a wheel-nut $k$, so as to vary the proportions of water and gas taken from the vessel $a$ at each stroke of the automatically-acting pump. This mixing-chamber is arranged in connection with the inlet to the pump, said inlet being provided with an automatically-acting inlet-valve $l$. The pump $m$ is also provided with an automatically-acting outlet-valve $n$, which communicates by a pipe $o$ with a spraying or saturating chamber $p$, in which the gas and liquid passes into a chamber $q$ and then down through a perforated plate or a rose or such like $r$. From the spraying-chamber the gas and liquid passes by pipe $s$ to a rose $t$, from whence it issues as a spray into the chamber $u$ of the vessel $a$. This chamber is open at its upper end, so as to be under the initial pressure of the gas in the vessel $a$. The pressure gas and liquid passes from the chamber $u$ by the pipe $v$ to the under side of the differential pump-piston $w$ and owing to the fact that the piston $w$ is larger than the piston $w'$ forces up said piston $w'$ and compresses the gas and liquid in the pump-cylinder $m$. At the upstroke of the piston $w'$ the gas and liquid in the pump $m$ is forced through the valve $n$ into the spraying-chamber $p$, while at the return stroke the gas and liquid from the mixing-chamber $i$ rushes through the valve $l$ into the pump $m$.

The supply and exhaust of pressure liquid to and from the pump-piston $w$ of the large motor-cylinder $m'$ is controlled by an automatic valve arrangement, consisting of two valves $x\ y$, acted on by a spring $x'$, the one controlling the fluid-inlet from the pipe $v$ and the other the exhaust-outlet to the pipe $v'$. The outlet-valve $y$ has a piston $y'$ in connection with it, and this piston may be acted on by means of pressure fluid admitted at the proper time from a branch pipe $z$ by the action of a reciprocating valve $z'$, rigidly connected by rods 1 and 2 with piston-heads 3 and 4, playing in the elongated valve-chamber 5. The pipe $z$ opens to this chamber between the valve $z'$ and the piston 4 and is never passed by either. The valve is moved to the left to admit pressure fluid from pipe $z$ through port 6 to the heavy valve-piston $y'$ and to the right to permit exhaust therefrom through pipe $z^6$ by fluid in pipes $z^2$ and $z^3$, respectively, the first being connected with a small pressure-cylinder $z^4$, at the bottom of which is normally kept by spring pressure piston 7, with its rod 8 projecting downward through the top wall of the large pump-cylinder and into said cylinder and the second being likewise connected with a second similar compression-cylinder $z^5$, in which the piston 9 is normally spring-supported at the top, with its rod 10 projecting centrally through the flooring of the large cylinder up into said cylinder. Near the end of the upstroke of the large pump-piston $w$ it strikes piston-rod 8 and forces piston 7 upward, compressing the fluid in pressure-cylinder $z^4$ and pipe $z^2$ and forcing valve $z'$ to the left by the action of said fluid upon piston-head 4, thus opening the port 6 to pressure-pipe $z$ and causing valve-piston $y'$ to rise and project its rod 11 upward into valve-box 12, containing the above-mentioned valves $x$ and $y$. Valve $x$, with its valve-rod, is supported by spring $x'$ from valve $y$, which is secured to the upper end of piston-rod 11. Therefore as valve-piston $y'$ rises said rod lifts valve $y$ from its seat, opening exhaust-passage $v'$ to the large pump-cylinder, and forces valve $x$ into its seat, cutting off pressure from pipe $v$, and thereupon pump-pistons $w\ w'$ fall by their weight until piston $w$ strikes piston-rod 10 and forces piston 9 down into pressure-cylinder $z^5$, compressing the fluid therein and in pipe $z^3$ and forcing piston-head 3 and valve $z'$ to the right to open port 6 to the exhaust, whereupon weighted piston $y'$ immediately falls, causing the closure of valve $y$ and releasing the spring-pressure on valve $x$ to such an extent that it is forced off its seat by the pressure in pipe $v$, opening said pipe again to the pump-cylinder $m'$ beneath piston $m$, whereby the latter is immediately returned upon an upstroke. In order to keep the pipes $z^2\ z^3$ normally under equal pressure and to replenish leakage, small ducts 13 14 are led through rods 1 and 2, piston-heads 3 and 4, and valve to a port or ports through rod 2 to the right of the valve, which ports are always in communication with branch pressure-pipe $z$.

If so desired, the gas and liquid may be passed direct to the pump-cylinder $m$ without the intervention of the mixing-chamber.

Having now fully described my invention, what I claim, and desire to secure by Letters Patent, is—

1. In machinery for manufacturing aerated or carbonated liquids, the combination with a means for supplying gas under pressure and a means for liquid-supply, of a chamber for mixing the gas and liquid, a constantly-acting pump for compressing the gas and liquid, means for conveying the gas and liquid from the chamber to the pump, and means whereby the mixed gas and liquid after being discharged from the compressing-pump is caused to actuate the same before being filled into the bottles.

2. In machinery for manufacturing aerated or carbonated liquids, the combination with a means for supplying gas under pressure and a means for liquid-supply, of a chamber for mixing the gas and liquid, a constantly-acting pump, with a differential piston for compressing the gas and liquid, means for conveying the gas and liquid from the chamber to the pump, and means whereby the exhaust gas and liquid after being discharged from the pump is caused to actuate the same before being filled into the bottles.

3. In machinery for manufacturing aerated or carbonated liquids, the combination with a means for supplying gas under pressure, and a means for liquid-supply, of a chamber for the gas and liquid, a mixing-chamber, pipe connections between the chambers, a pump, a connection leading from the mixing-chamber to the pump, a spraying-chamber, a pipe leading from the pump to the spraying-chamber, a pipe for conveying the gas and liquid from the spraying-chamber back to the chamber for the gas and liquid and means whereby the pressure fluid in this chamber is utilized to operate the pump.

4. In machinery for manufacturing aerated or carbonated liquids, the combination with a means for supplying gas under pressure and a means for liquid-supply, of a chamber for the gas and liquid, a movable mixing-chamber, flexible pipe connections between the chambers, a pump, a connection leading from the mixing-chamber to the pump, a spraying-chamber, a pipe leading from the pump to the spraying-chamber, and means whereby the gas and liquid on delivery from the spraying-chamber is caused to actuate the pump before being filled into the bottles.

5. In machinery for manufacturing aerated or carbonated liquids, the combination with a means for supplying gas under pressure, and a means for liquid-supply, of a chamber for the gas and liquid, a movable mixing-chamber supported on a hollow column screw-threaded externally, a support for the column, a nut working on the column and adapted to move the same, flexible pipe connections between the chambers, a pump, a connection leading from the mixing-chamber to the pump, a spraying-chamber, a pipe leading from the pump to the spraying-chamber, and means whereby the gas and liquid on delivery from the spraying-chamber, is caused to actuate the pump before being filled into the bottles.

6. In machinery for manufacturing aerated or carbonated liquids, the combination with a means for supplying gas under pressure and a means for liquid-supply, of a chamber for the gas and liquid, a mixing-chamber, pipe connections between the chambers, a pump, a connection leading from the mixing-chamber to the pump, an automatic inlet-valve on the pump, and an automatic outlet-valve, a spraying-chamber, a pipe leading from the pump to the spraying-chamber, a pipe leading from the spraying-chamber to the gas and liquid chamber and means whereby the gas and liquid is conveyed back through the first-mentioned chamber and then conducted by means of pipe connections provided with valves so as to operate the pump.

7. In machinery for manufacturing aerated or carbonated liquids, the combination with a means for supplying gas under pressure and a means for liquid-supply, of a chamber for the gas and liquid, a pump having a small and large cylinder, a differential piston working in said cylinders, means for supplying the gas and liquid to the small cylinder, means for exhausting the gas and liquid from said cylinder and means whereby gas and liquid from the small cylinder is eventually delivered to the large cylinder to actuate the differential piston, substantially as described.

8. In machinery for manufacturing aerated or carbonated liquids, the combination with a means for supplying gas under pressure and a means for liquid-supply, of a chamber for the gas and liquid, a pump having a small and large cylinder, a differential piston working in said cylinders, means for supplying the gas and liquid to the small cylinder, means for exhausting the gas and liquid from said cylinder, means whereby gas and liquid is delivered to the large cylinder to actuate the differential piston and means for controlling the movements of the piston, substantially as described.

9. In machinery for manufacturing aerated or carbonated liquids, the combination with a means for supplying gas under pressure, and a means for liquid-supply, of a chamber for mixing the gas and liquid, a constantly-acting pump having a differential piston for compressing the gas and liquid, means for conveying the gas and liquid from the mixing-chamber to the pump, a spraying-chamber, means for conveying the exhaust gas and liquid from the pump to the spraying-chamber and means whereby the pressure fluid in the spraying-chamber is used to actuate the differential piston of the pump.

Signed at Glasgow, Scotland, this 26th day of December, 1902.

HUGH GLASS WATSON.

Witnesses:
  WILLIAM GALL,
  HUGH D. FITZPATRICK.